(12) United States Patent
Chiang et al.

(10) Patent No.: US 7,983,442 B2
(45) Date of Patent: Jul. 19, 2011

(54) METHOD AND APPARATUS FOR DETERMINING HIGHLIGHT SEGMENTS OF SPORT VIDEO

(75) Inventors: Yueh-Hsuan Chiang, Taipei (TW); Ming-Jun Chen, Tai-Nan (TW); Bor-Ching Lin, Taipei (TW); Ho-Chao Huang, Taipei (TW)

(73) Assignee: CyberLink Corp., Xindian Dist., New Taipei (TW)

( * ) Notice: Subject to any disclaimer, the term of this patent is extended or adjusted under 35 U.S.C. 154(b) by 719 days.

(21) Appl. No.: 12/129,695

(22) Filed: May 30, 2008

(65) Prior Publication Data
US 2009/0060342 A1  Mar. 5, 2009

Related U.S. Application Data

(60) Provisional application No. 60/968,571, filed on Aug. 29, 2007.

(51) Int. Cl.
*G06K 9/00* (2006.01)
*G06K 9/46* (2006.01)
*G06K 9/66* (2006.01)
*H04N 7/18* (2006.01)
*A63B 69/00* (2006.01)
*A63B 71/06* (2006.01)
*G07C 1/24* (2006.01)
*G06F 19/00* (2011.01)

(52) U.S. Cl. ............. 382/100; 348/157; 340/323 R; 700/91; 700/92; 382/190

(58) Field of Classification Search ........... 382/100, 382/190; 348/157; 340/323 R; 700/91, 700/92
See application file for complete search history.

(56) References Cited

U.S. PATENT DOCUMENTS

| | | | |
|---|---|---|---|
| 6,807,558 B1 * | 10/2004 | Hassett et al. | 709/203 |
| 6,944,509 B2 * | 9/2005 | Altmaier et al. | 700/92 |
| 7,587,214 B2 * | 9/2009 | Inselberg | 455/517 |
| 7,751,774 B2 * | 7/2010 | Muneomi | 455/3.06 |
| 7,899,250 B2 * | 3/2011 | Huang et al. | 382/176 |
| 2002/0044045 A1 * | 4/2002 | Crookham et al. | 340/323 R |
| 2005/0138106 A1 * | 6/2005 | Crookham et al. | 709/200 |
| 2005/0231613 A1 * | 10/2005 | Skurdal et al. | 348/239 |
| 2006/0075454 A1 * | 4/2006 | Jung et al. | 725/135 |
| 2006/0094409 A1 * | 5/2006 | Inselberg | 455/414.1 |
| 2007/0136758 A1 * | 6/2007 | Lehikoinen et al. | 725/53 |

* cited by examiner

*Primary Examiner* — Andrew W Johns
*Assistant Examiner* — Shefali Goradia
(74) *Attorney, Agent, or Firm* — Winston Hsu; Scott Margo (57) ABSTRACT

In a method for determining highlight segments of a sport video, the sport video having a plurality of image frames is analyzed to recognize a scoreboard image and a plurality of scoreboard characteristics thereof. The scoreboard image comprises at least one of the scoreboard characteristics. Then, a request message showing at least one recognized scoreboard characteristic is displayed on a user interface to receive a user response, wherein the user response includes a recognized result of one of the scoreboard characteristics. Finally, variations in the recognized scoreboard image among image frames can be monitored according to the user response. Therefore, the highlight segments of the sport video can be determined according to the variations.

32 Claims, 13 Drawing Sheets

METHOD AND APPARATUS FOR DETERMINING HIGHLIGHT SEGMENTS OF SPORT VIDEO

CROSS REFERENCE TO RELATED APPLICATIONS

This application claims the benefit of U.S. Provisional Application No. 60/968,571, filed on Aug. 29, 2007 and entitled "Determining Method for Highlighted Clips of a Sport Video", the contents of which are incorporated herein by reference.

BACKGROUND OF THE INVENTION

1. Field of the Invention

The present invention relates to a method and apparatus for determining highlight segments of a sport video, and more particularly, to a method and apparatus for determining the highlight segments of the sport video more accurately by verifying correctness of recognized scoreboard characteristics through a user interface in advance.

2. Description of the Prior Art

In recent years, due to the popularity of sport activities, watching sports videos has been an important and popular recreation in daily life. However, since broadcast sports videos generally last several hours, viewers are often impatient at the preparation time of athletes, time-out durations or the redundant advertisements. Thus, the viewers nowadays often record the sport videos in advance, so that they can fast-forward the boring segments or can trace back and forth to search highlight segments such as a home run in a baseball game, a shot in a soccer game or an ace in a tennis game, etc, instead of viewing the entire game.

Moreover, with the development of multimedia technology, the sport videos can further be analyzed for extracting desired events or interesting highlights automatically by some image processing tools. Some conventional methods can determine the highlights based on special sounds or inherent image characteristics in the sport videos. For example, by analyzing the special sounds like whistling, horns or the applauses of the audiences in the sport videos, exciting events like foul plays, game-over or scorings can be detected. In addition, analyzing the image characteristics in the sport videos can also determine highlights of the sport videos.

Figure 1:
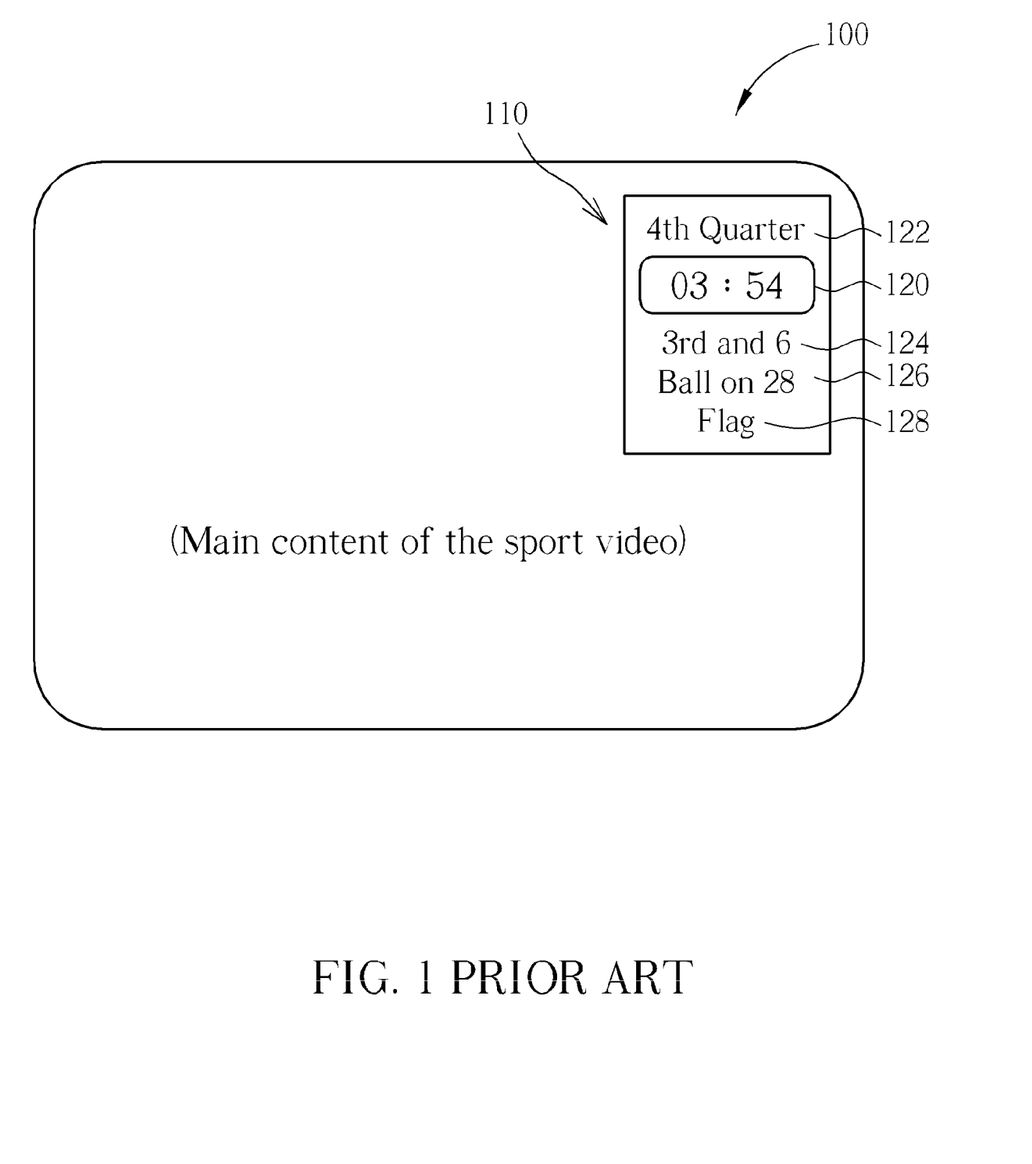
FIG. 1 is a schematic diagram of an image frame of a sport video displayed on a screen.

Please refer to FIG. 1, which shows an image frame 100 of a sport video displayed on a screen. The image frame 100 includes main content of the sport video and a scoreboard image 110 on an upper right corner. The scoreboard image 110 represents a current status of a sport game in the sport video, and has a plurality of scoreboard characteristics such as a playing clock 120, a game period 122, an offense status 124, a ball location 126 and a foul flag 128 when taking an American football game for example.

In the prior art, the special sounds and the image characteristics in the sport videos have to be identified in advance so as to perform the following highlight determination. However, the highlights or exciting events cannot be identified correctly enough. In this case, the users have to trace back and forth to search the highlight segments manually, which significantly causes inconvenience of the users and reduces delights when watching the sport videos.

SUMMARY OF THE INVENTION

According to an embodiment of the present invention, a method for determining highlight segments of a sport video comprising receiving the sport video, wherein the sport video comprises a plurality of image frames, analyzing the sport video to recognize a scoreboard image and a plurality of scoreboard characteristics, wherein the scoreboard image comprises at least one of the scoreboard characteristics. The method further comprises displaying a request message showing at least one recognized scoreboard characteristic on a user interface to receive a user response, wherein the user response includes a recognized result of one of the scoreboard characteristics, and monitoring variations in the recognized scoreboard image among image frames according to the user response. The method even further comprises determining the highlight segments of the sport video according to the variations.

Another embodiment includes an apparatus for determining highlight segments of a sport video comprising a receiver for receiving the sport video, an analyzer connected to the receiver for analyzing the sport video to recognize a scoreboard image and a plurality of scoreboard characteristics, wherein the scoreboard image comprises at least one of the scoreboard characteristics, a user interface connected to the analyzer for displaying a request message showing at least one recognized scoreboard characteristic to receive a user response, wherein the user response includes a recognized result of one of the scoreboard characteristics. The apparatus further comprises a detector coupled to the user interface for monitoring variations in the recognized scoreboard image among image frames according to the user response, and a determination module for determining the highlight segments of the sport video according to the variations.

These and other objectives of the present invention will no doubt become obvious to those of ordinary skill in the art after reading the following detailed description of the preferred embodiment that is illustrated in the various figures and drawings.

DETAILED DESCRIPTION

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Figure 2:
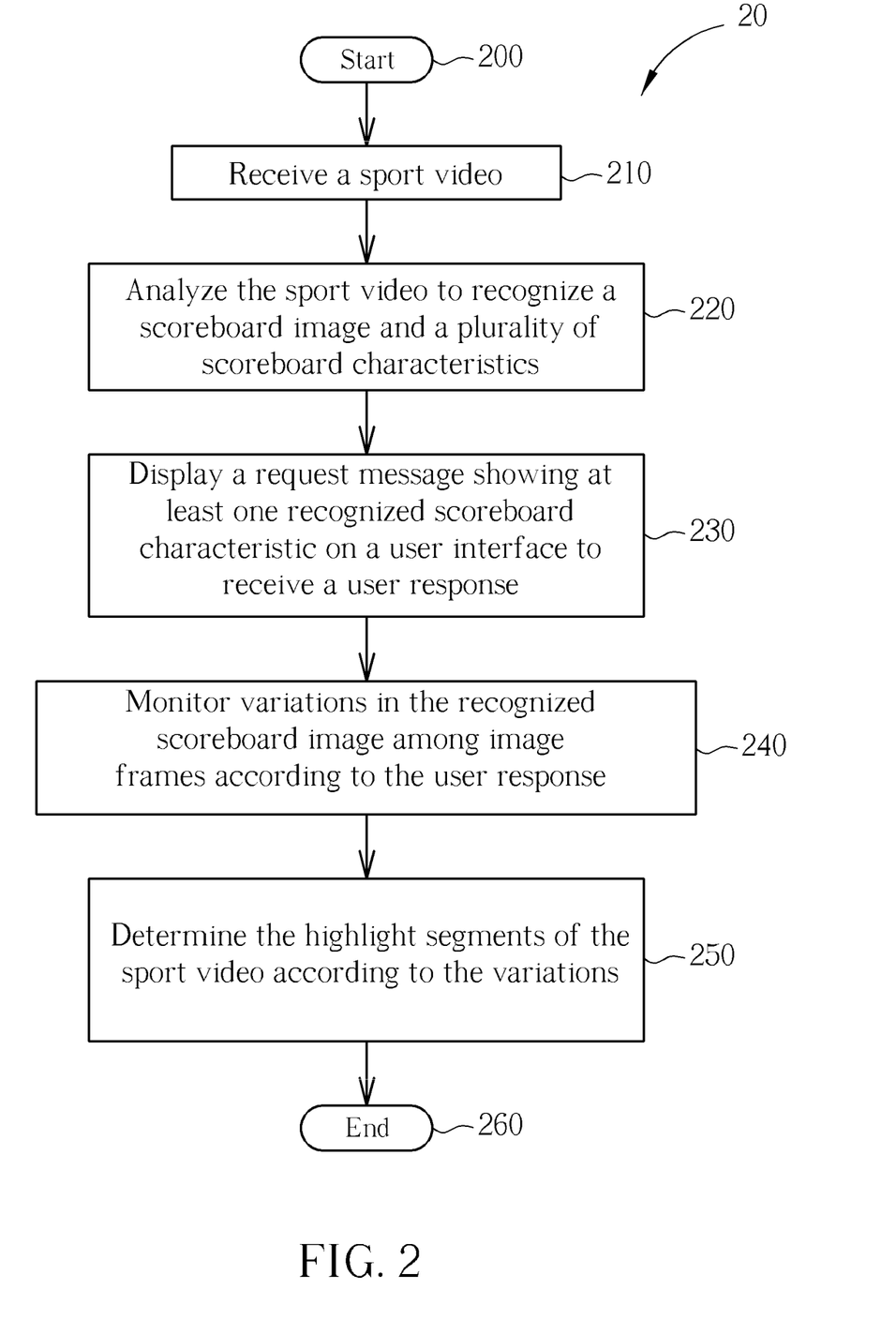
FIG. 2 is a schematic diagram of an embodiment of a process for determining highlight segments of a sport video.

Embodiments of method and apparatus for determining highlight segments of sport video are disclosed. Reference is now made to FIG. 2, which is a schematic diagram of an embodiment of a process 20 for determining highlight segments of a sport video. Beginning with Step 210, the sport video comprising a plurality of image frames is received. Next, in Step 220, the sport video is analyzed to recognize a scoreboard image and a plurality of scoreboard characteristics, in which the scoreboard image includes at least one of the scoreboard characteristics. In Step 230, a request message showing at least one recognized scoreboard characteristic is displayed on a user interface to receive a user response including a recognized result of one of the scoreboard characteristics. In Step 240, variations in the recognized scoreboard image among image frames can be monitored according to the user response. Finally, in Step 250, the highlight segments of the sport video can be determined according to the variations.

Preferably, the sport video is a recorded video stored in a storage device, and at least one of the plurality of image frames comprises the scoreboard image. Thus, by comparing the plurality of image frames of the sport video, an image range with little variation can be recognized and determined to be the scoreboard image of the sport video. Furthermore, metadata such as occurrence time, duration and number of times of the determined highlight segments can be stored into a database. In addition, the recognized scoreboard images could further be stored into the database as reference patterns, such that when processing video analysis for a subsequent sport video with the same sport game type, the matched patterns in the image frames can be determined as the scoreboard image, and the scoreboard characteristics thereof can be easily found as well.

Please note that, the method of the present invention can determine audience-interested (highlight) events in the sport video and audience-not-interested events, such as an advertisement. In other words, after the sport video is performed by the highlight determination method of the present invention, not only the interested events can be extracted, but also the uninterested events in the sport video can be skipped.

Figure 3:
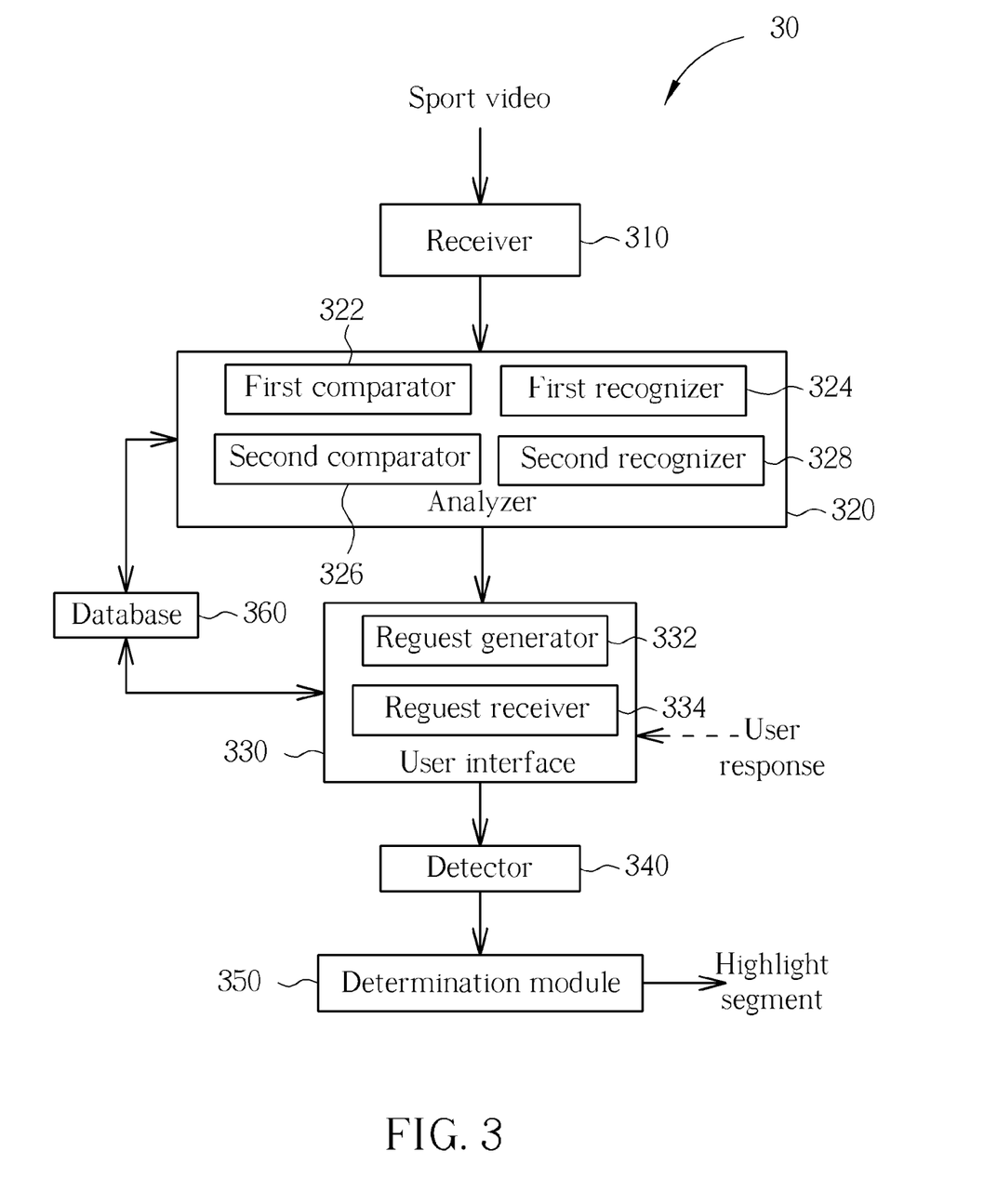
FIG. 3 is a function block diagram of an embodiment of an apparatus for a display system determining highlight segments of a sport video.

Please refer to FIG. 3. FIG. 3 is a function block diagram of an embodiment of an apparatus 30 for a display system determining highlight segments of a sport video. The exemplary apparatus is merely utilized for realizing the above process 20. The exemplary apparatus 30 comprises a receiver 310, an analyzer 320, a user interface 330, a detector 340 and a determination module 350. The receiver 310 receives the sport video comprising a plurality of image frames. For some embodiments, the sport video can be broadcasted from a server and pre-recorded in a storage device connected to the apparatus 30. The analyzer 320 is connected to the receiver 310, and includes a first comparator 322 and a first recognizer 324. The first comparator 322 compares the image frames of the sport video for recognizing a region with small variation between the image frames. The first recognizer 324 then determines the recognized region to be a scoreboard image and recognizes a plurality of scoreboard characteristics thereof. The user interface 330 is connected to the analyzer 320, and includes a request generator 332 and a request receiver 334. The request generator 332 displays a request message showing at least one recognized scoreboard characteristic on the interface. The request receiver 334 then receives a user response for determining the recognized scoreboard characteristics, wherein the user response includes a recognized result of one of the scoreboard characteristics. The detector 340 coupled to the user interface 330 is configured to monitor variations in the recognized scoreboard image among image frames according to the user response. The determination module 350 then determines the highlight segments of the sport video according to the variations. The detailed operations of the apparatus 30 are described in the following paragraphs.

In some embodiments, the apparatus 30 further includes a database 360 for storing the recognized results to be reference patterns when processing video analysis for a subsequent sport video with the same sport game type. In this case, the analyzer 320 further includes a second comparator 326 and a second recognizer 328. The second comparator 326 compares the image frames with the reference patterns of each of sport games stored in the database. Afterward, the second recognizer 328 determines matched patterns in the image frames as the scoreboard image and the scoreboard characteristics thereof.

In detailed operations, the user interface displays a scoreboard image of one of the plurality of image frames and generates a request message showing at least one recognized scoreboard characteristic for requesting the users to check if the recognized scoreboard characteristics are correctly analyzed or not. Then, the user response indicates correctness of the recognized scoreboard characteristics displayed on the scoreboard image, such that variations in the recognized scoreboard image among image frames can be monitored. Since the variations represents occurrences of most events in the sport game of the sport video, the highlight segments of the sport video can then be determined accordingly.

Therefore, by verifying the correctness of the scoreboard image and the scoreboard characteristics thereof in advance through the user interface, the highlight segments of the sport video can be determined more accurately in the present invention, so as to enhance convenience for the users when searching and extracting highlight segments in the sport videos.

Preferably, the scoreboard characteristics are content data of the scoreboard image. The content data includes number data, text data, brightness and status of the scoreboard characteristics in the image frames. For example, when the sport video is a baseball game video, the scoreboard characteristics are scores, hits, errors, base status and the number of balls, strikes and player outs; when the sport video is an American football game video, the scoreboard characteristics are game clocks, scores, flags, touch downs (TD) and field goals (FG); and when the sport video is a soccer game video, the scoreboard characteristics are game clocks, scores, fouls and the number of red cards and yellow cards, etc.

Figure 4:
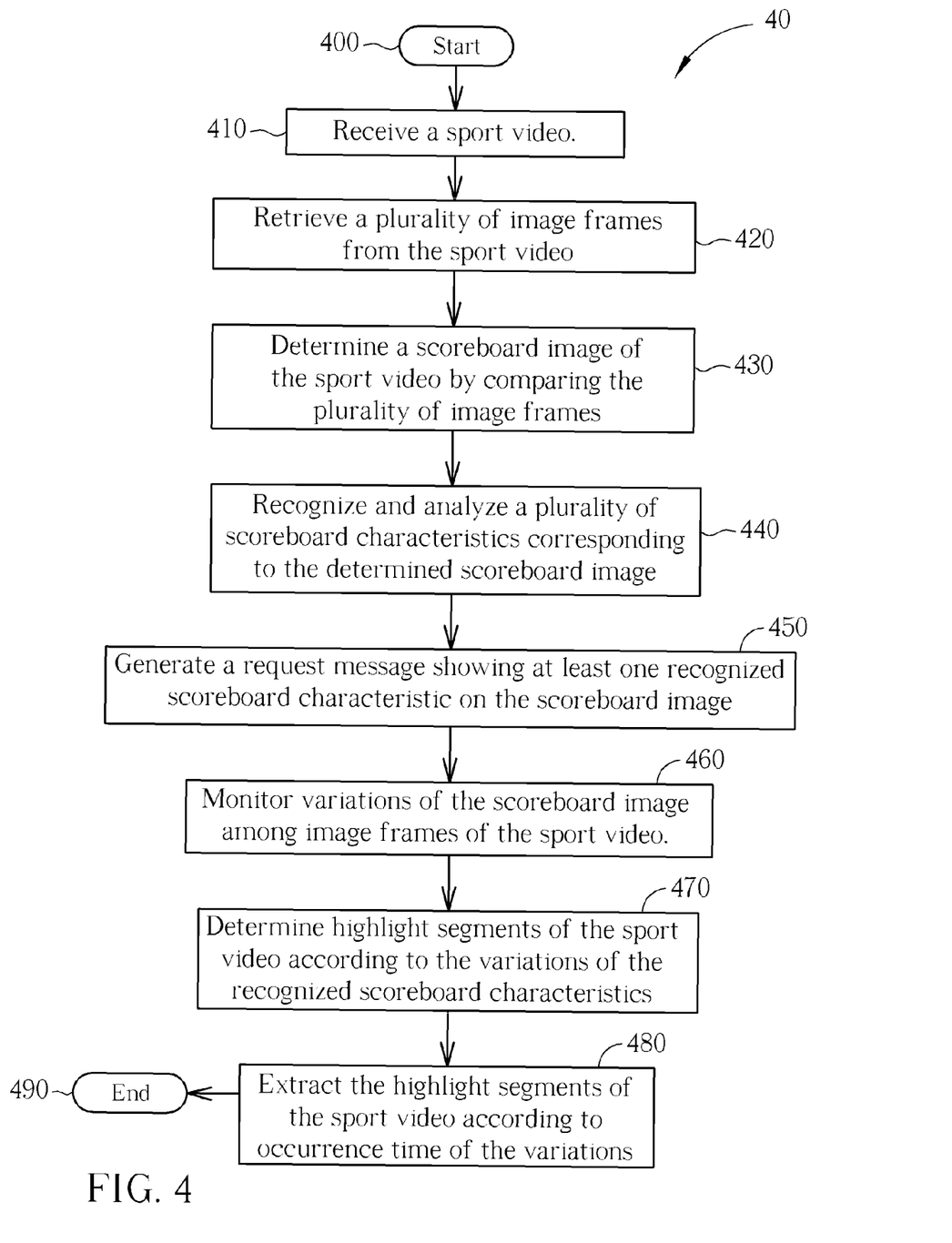
FIG. 4 is a schematic diagram of an embodiment of a process for extracting highlight segments of a sport video.

Please continue to refer to FIG. 4, which is a schematic diagram of another embodiment of a process 40 for extracting highlight segments of a sport video. In this embodiment, the sport video from a video source, such as a VCD player, a DVD player or a television, is firstly received and stored into a storage device (Step 410). Then, a plurality of image frames are retrieved from the sport video (Step 420). By comparing the plurality of image frames, an image range with small variation can be determined as a scoreboard image of the sport video (Step 430). Afterwards, a plurality of scoreboard characteristics corresponding to the determined scoreboard image is recognized and analyzed according to reference scoreboard patterns of each kind of sport games stored in a database (Step 440).

Next, in order to receive a user response indicating whether the scoreboard characteristics are recognized correctly, a request message showing at least one recognized scoreboard characteristic is displayed on a user interface (Step 450). The detailed descriptions of the user interface are illustrated in the following embodiments. After receiving a user response indicating correctness of the recognized scoreboard characteristics, variations of the scoreboard image among image frames of the sport video can be monitored according to the user response (Step 460). Finally, the highlight segments of the sport video can then be more accurately determined according to the variations among the plurality of image frames (step 470).

Note that the variations of the scoreboard image can be divided into two types: One is variation of the scoreboard image itself, and the other is scoreboard characteristic variation of the scoreboard image. The variation of the scoreboard image itself occurs, for example, when the scoreboard image disappears in the sport game video, which may represents events such as an advertisement fragment or a highlight zoom-in shot in the sport game video. The scoreboard characteristic variation of the scoreboard image is the variation of the scoreboard characteristics mentioned above, which may represent events like scorings, fouls, players outs, etc.

For example, scoring events can be determined according to number data variation of a scoring field in the scoreboard image, foul play events can be determined according to brightness variation of a foul flag in the scoreboard image, and so on. Certainly, metadata such as event durations and event importance corresponding to the variations of the scoreboard characteristics can be defined in advance and stored into the database. Thus, the highlight segments of the sport video can then be extracted according to occurrence time of the variations of the scoreboard characteristics and the metadata stored in the database, and further stored into the storage device (step 480).

Preferably, metadata such as occurrence time, duration and number of times corresponding to the highlight segments of the sport video can further be generated and stored into the database, such that the metadata can be taken as references when processing other sport videos having the same sport game type.

Figure 5A:
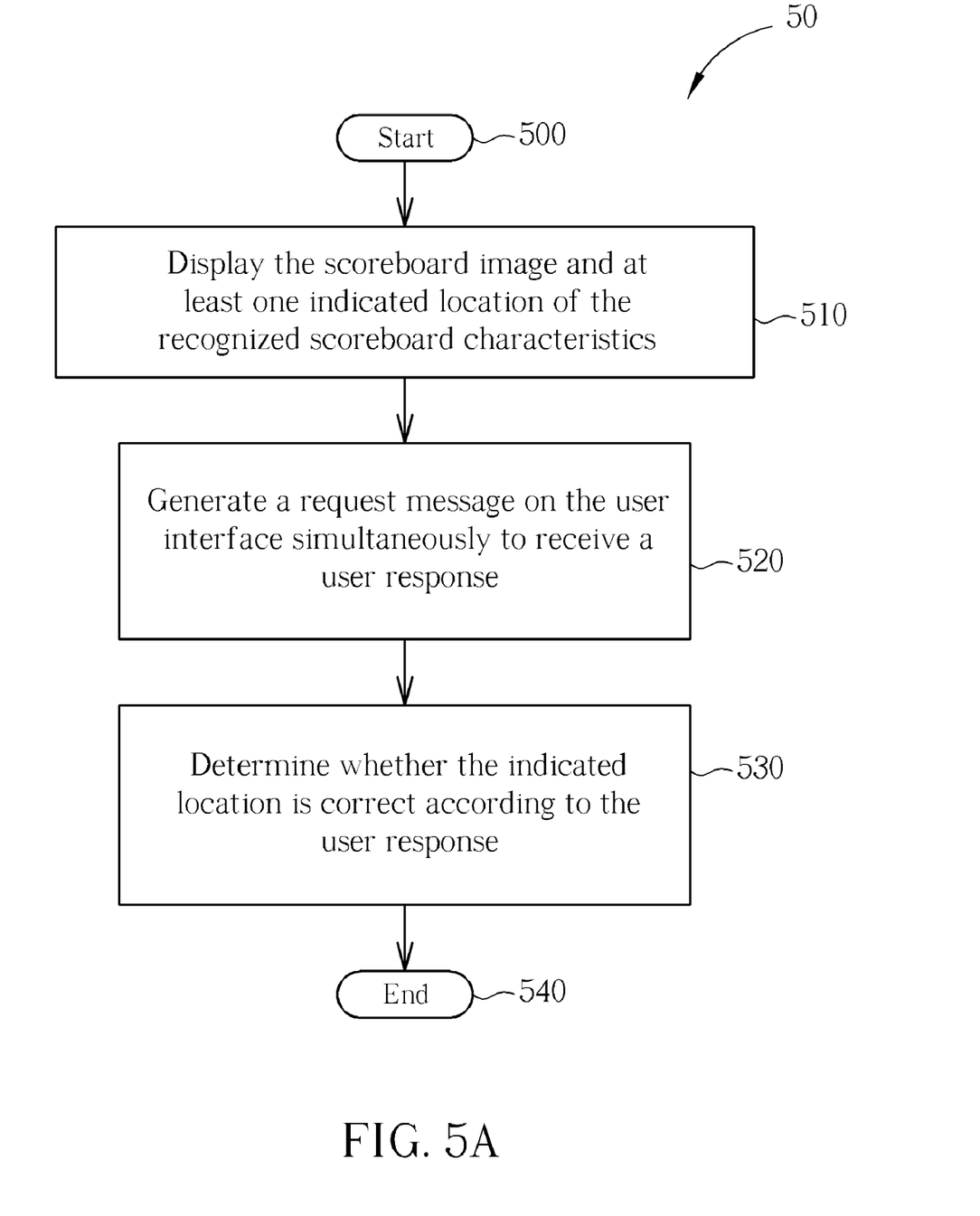
FIG. 5A is a schematic diagram of an embodiment of a process for generating a user interface.

Please refer to FIG. 5A, which is a schematic diagram of an embodiment of a process 50 for generating a user interface. The process 50 implements the user interface for requesting users to check if scoreboard characteristics corresponding to a scoreboard image are recognized correctly. In this embodiment, the scoreboard image and at least one indicated location of the recognized scoreboard characteristics are displayed (Step 510). Then, a request message is generated simultaneously on the user interface to receive a user response (Step 520). Finally, correctness of the indicated location can be determined according to the user response (Step 530).

When the user response indicates that the indicated locations are correct, the recognized scoreboard characteristics are considered correct as well, so that the following highlight determination steps can then be performed. Conversely, the user interface indicates other possible locations of the recognized scoreboard characteristics and generates another request message until the indicated locations of the recognized scoreboard characteristics are correct and confirmed by the users.

Figure 5B:
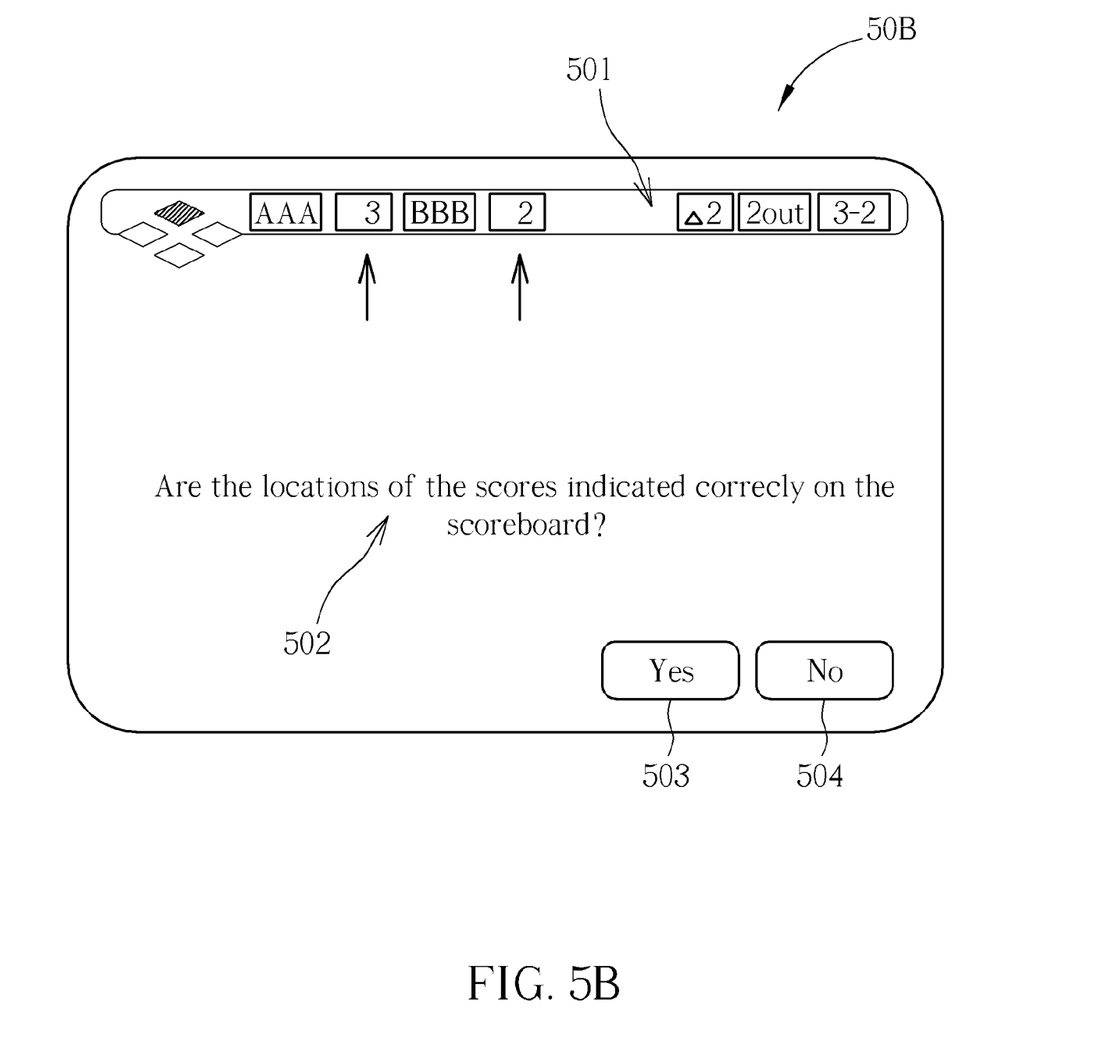
FIG. 5B is a schematic diagram of an embodiment of a user interface for realizing the process of FIG. 5A.

Please refer to FIG. 5B, which shows an embodiment of a user interface 50B for realizing the process 50 of the present invention. The user interface 50B comprises a scoreboard image 501, a request message 502 and confirmation buttons 503 and 504. The scoreboard image 501 shows a current status of a baseball game corresponding to an image frame in the sport video and comprises scoreboard characteristics such as base status, team names ("AAA" and "BBB"), scorings ("3" and "2"), innings ("▲2"), the number of player outs ("2-out") and the number of balls and strikes ("3-2"). The request message 502 is utilized for requesting the users to check if recognized locations of the scoring fields ("3" and "2") on the scoreboard image 501 (indicated by two arrow symbols in FIG. 5B) are correct. The confirmation buttons 503 and 504 are utilized for generating user responses according to correctness of the indicated locations. Therefore, based on the user responses generated by the confirmation buttons 503 and 504, correctness of the recognized scoreboard characteristics can be determined.

When the user response is "Yes" generated by the confirmation button 503, the recognized scoreboard characteristics of the sport video are considered to be correct, so that highlights of the sport video can then be determined according to variations of the recognized scoreboard characteristics. Conversely, when the user response is "No" generated by the confirmation button 504, indicating that the two indicated locations are incorrect, the user interface 50B then indicates other possible locations of the scorings on the scoreboard image 501 (not shown in FIG. 5B) until the indicated locations are correct and confirmed by the users.

Figure 6A:
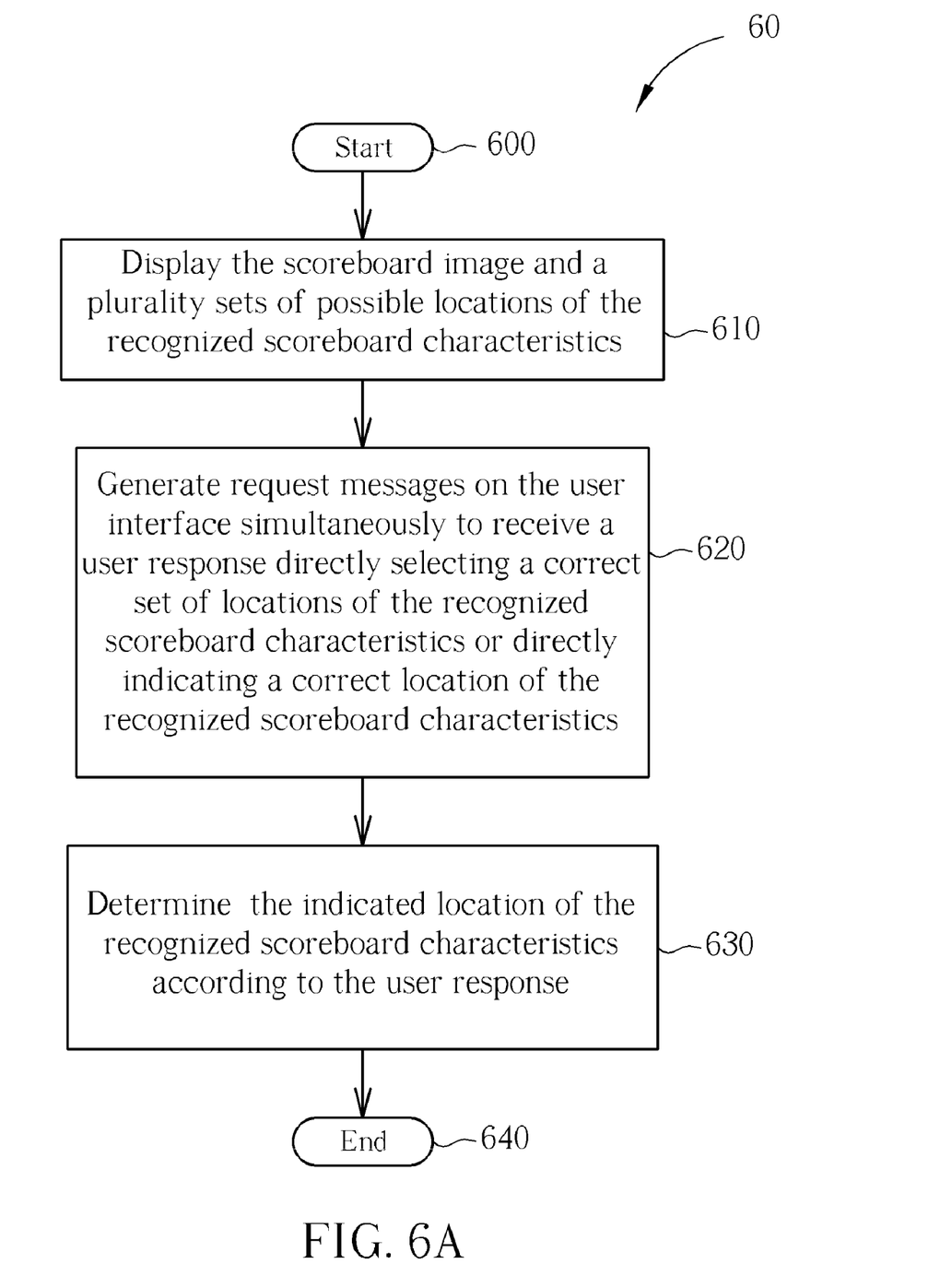
FIG. 6A is a schematic diagram of another embodiment of a process for generating a user interface.

Please further refer to FIG. 6A, which is a schematic diagram of another embodiment of a process 60 for generating a user interface. The process 60 also implements the user interface for requesting users to check if scoreboard characteristics corresponding to a scoreboard image are recognized correctly. In this embodiment, a plurality set of possible locations of the recognized scoreboard characteristics are displayed (Step 610). Then, a request message is simultaneously generated on the user interface to receive a user response directly selecting a correct set of locations of the recognized scoreboard characteristics (Step 620). If the indicated locations are all incorrect, another request message is displayed simultaneously to receive the user response directly indicating a correct location of the recognized scoreboard characteristics. Finally, actual locations of the recognized scoreboard characteristics can be determined according to the user response (Step 630).

Figure 6B:
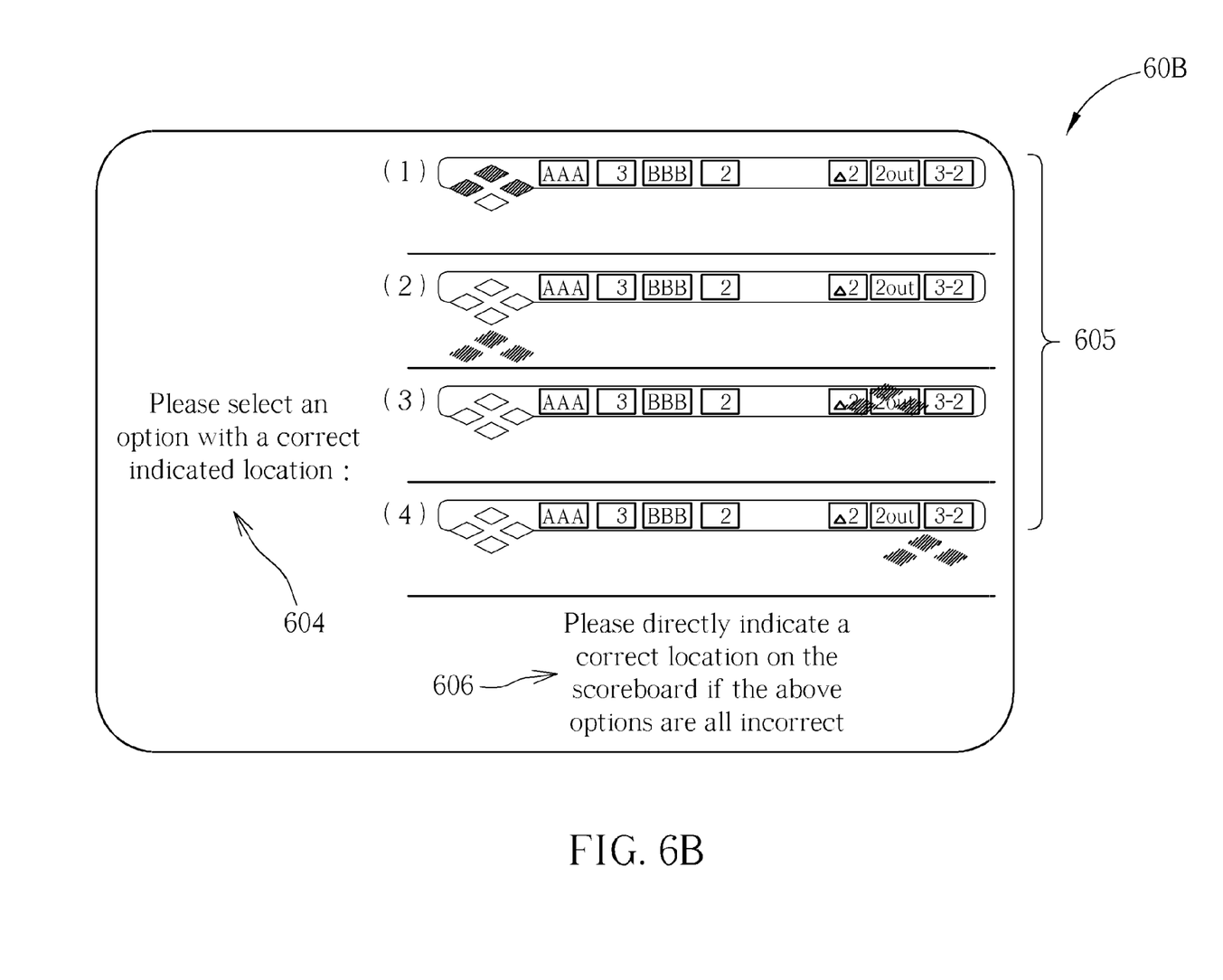
FIG. 6B is a schematic diagram of another embodiment of a user interface for realizing the process of FIG. 6A.

For example, please refer to FIG. 6B, which shows another embodiment of a user interface 60B for realizing the process 60 of the present invention. Compared with FIG. 5B, the user interface 60B can simultaneously provide four possible locations of a recognized scoreboard characteristic (ex. base status) of a scoreboard image 605, and generates a request message 604 for requesting the users to select a correct location from the four possible locations and an another request message 606 for requesting the users to directly indicate the correct location of the recognized scoreboard characteristics. In this case, if the possible locations provided by the user interface 60B are incorrect, the users can directly indicate the correct location of the recognized scoreboard characteristic according to the request message 606. Thus, based on the user responses corresponding to the request message 604 and 606, the correctness of the recognized scoreboard characteristics can be determined. Certainly, the number of the possible identification locations provided by the user interface 60B can be modified according to practical demands, and are not limited herein.

Briefly speaking, since the correctness of the recognized scoreboard characteristics are determined, the following highlight determination steps can be performed more accurately according to the variations of the recognized scoreboard characteristics.

Figure 7A:
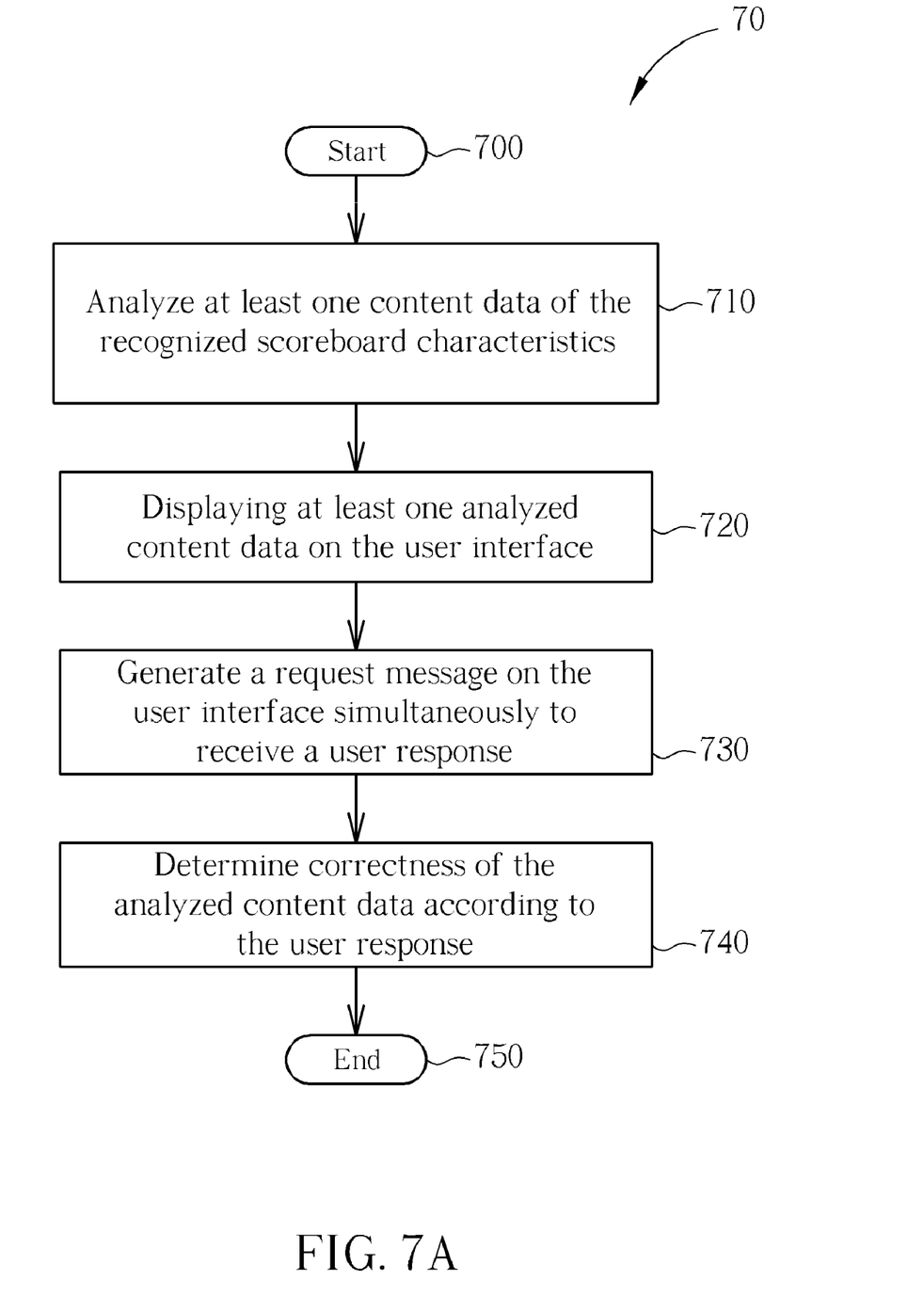
FIG. 7A is a schematic diagram of further another embodiment of a process for generating a user interface.

Please further refer to FIG. 7A. FIG. 7A is a schematic diagram of a further another embodiment of a process 70 for generating a user interface. The process 70 implements the user interface for requesting users to check if scoreboard characteristics of a sport video are recognized correctly.

In the embodiment, at least one content data of the recognized scoreboard characteristics is firstly analyzed (Step 710). Then, at least one analyzed content data is displayed on the user interface (Step 720). Next, a request message is simultaneously generated on the user interface for requesting the users to check if the analyzed content data is correct (step 730). Finally, correctness of the analyzed content data can be determined according to the user response (Step 740).

Figure 7B:
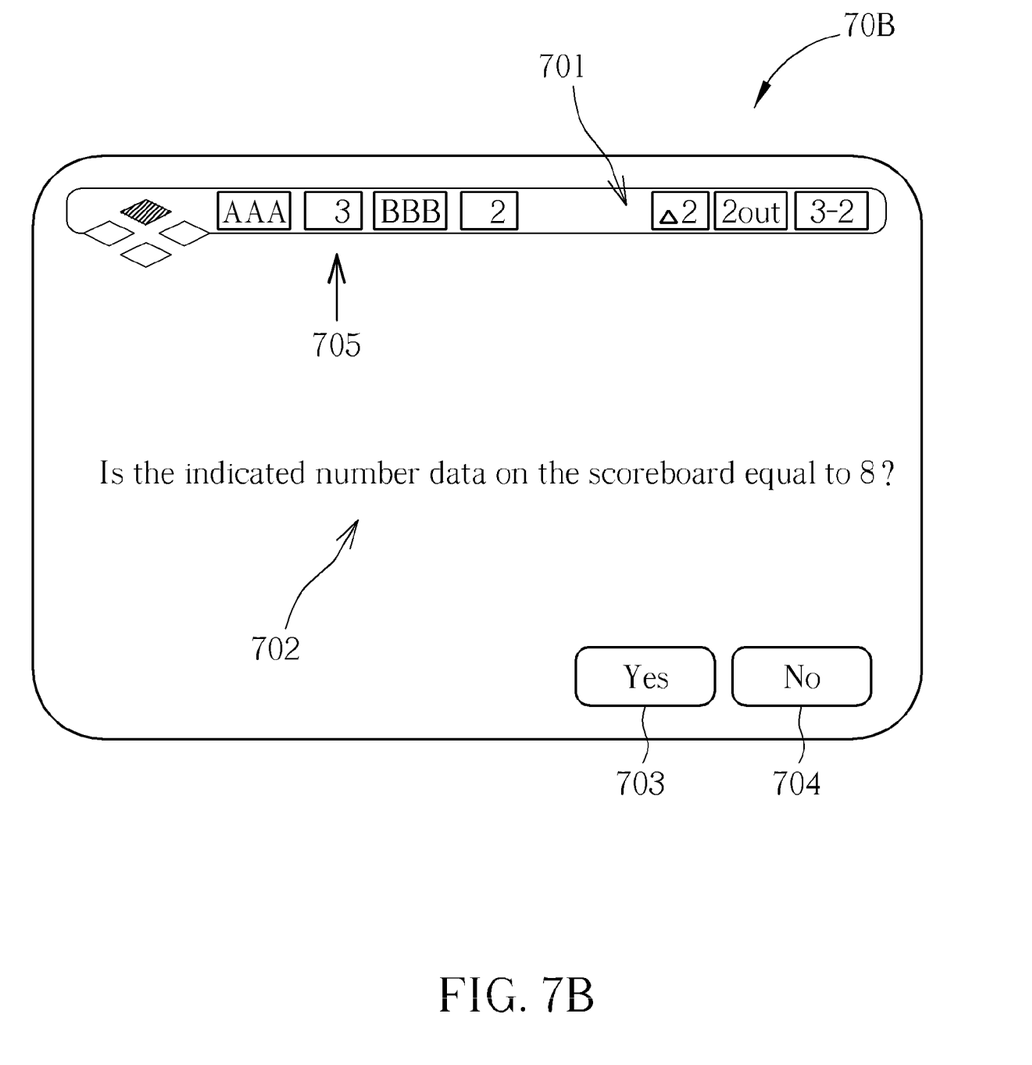
FIG. 7B is a schematic diagram of an embodiment of a user interface for realizing the process of FIG. 7A.

For example, please refer to FIG. 7B, which shows an embodiment of a user interface 70B for realizing the process 70 of the present invention. In this case, the user interface 70B displays a scoreboard image 701 and indicates a recognized scoreboard characteristic 705 (i.e. scorings of a team "AAA") by an arrow symbol as shown in FIG. 7B. Then, the user interface 70B simultaneously generates a request message 702 for requesting the users to check if the analyzed number data of the recognized scoreboard characteristic 705 are correct. If the analyzed number data of the recognized scoreboard characteristic 705 is determined to be correct according to a user response "Yes" generated through a confirmation button 703, the recognized scoreboard characteristic are also determined to be correct, so that highlight segments of the sport video can be determined according to the variations of the recognized scoreboard characteristics. Conversely, if the analyzed number is determined to be incorrect according to the user response "No" generated through a confirmation button 704, the user interface 70B then can generate another request message for requesting the users to check correctness of other analyzed number data until the user response "Yes" is received.

Therefore, by confirming the content data of the recognized scoreboard characteristics on the scoreboard image, the embodiment of the present invention can also determine correctness of the recognized scoreboard characteristics, so as to perform the following highlight determination steps accordingly.

Figure 8A:
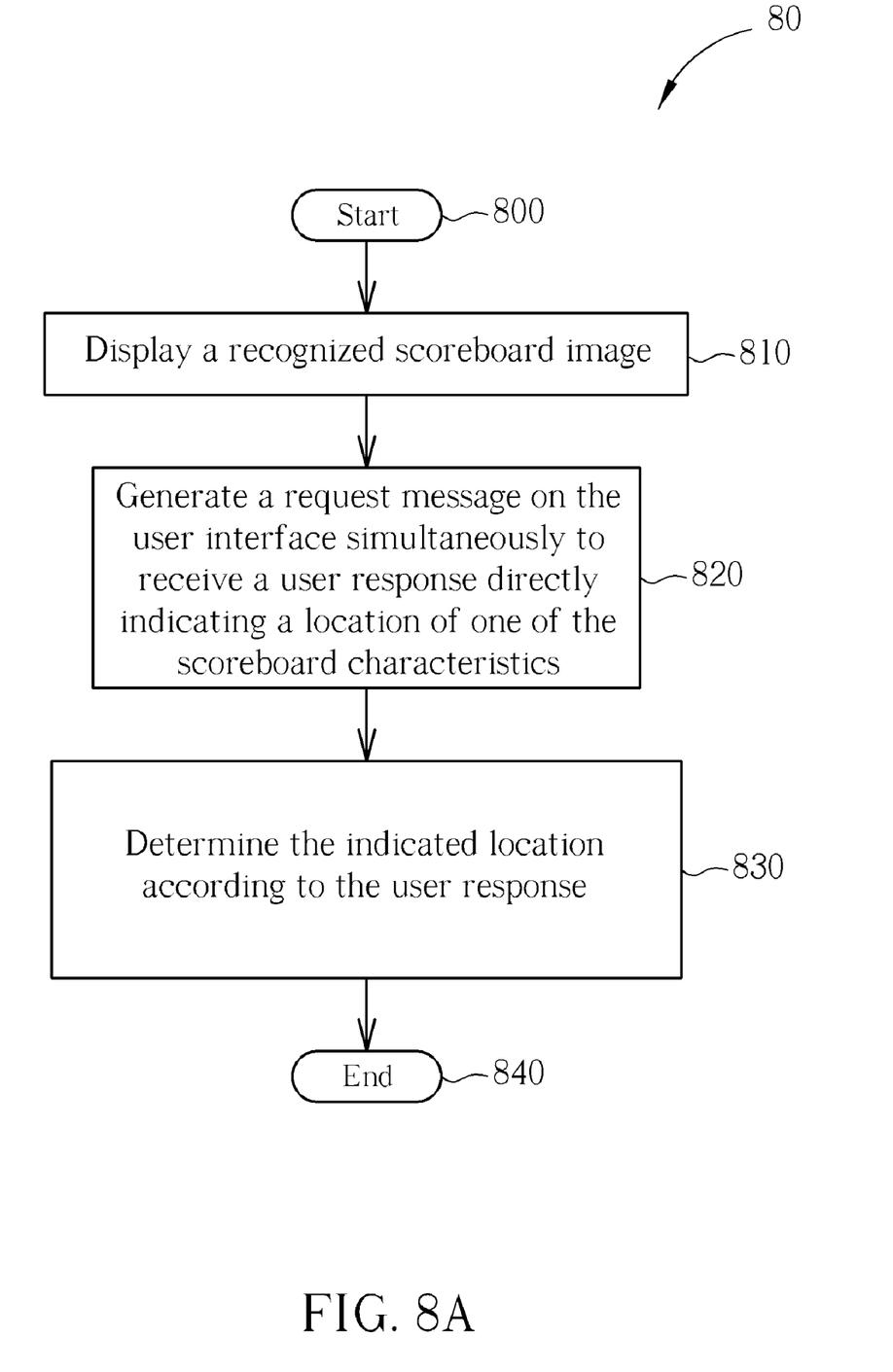
FIG. 8A is a schematic diagram of further another embodiment of a process for generating a user interface.

Please refer to FIG. 8A. FIG. 8A is a schematic diagram of a further another embodiment of a process 80 for generating a user interface. The process 80 implements the user interface for requesting users to check if scoreboard characteristics corresponding to a scoreboard image are recognized correctly. In this embodiment, the user interface displays a recognized scoreboard image (step 810). Then, a request message is simultaneously generated on the user interface to receive a user response directly indicating a location of one of the scoreboard characteristics (Step 820). Finally, locations of the recognized scoreboard characteristics can be determined according to the user response (Step 830).

Figure 8B:
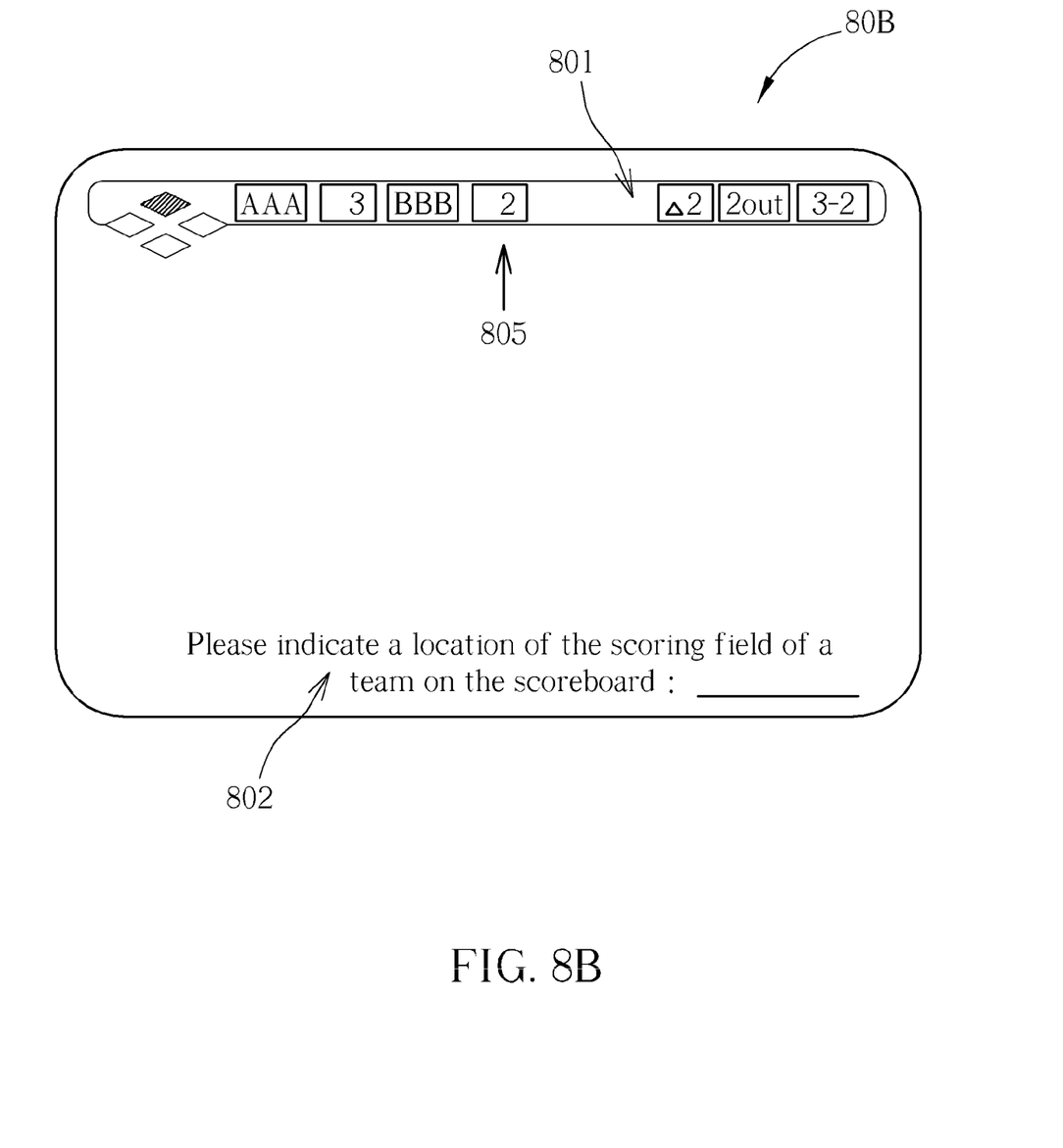
FIG. 8B is a schematic diagram of an embodiment of a user interface for realizing the process of FIG. 8A.

For example, please refer to FIG. 8B, which shows an embodiment of a user interface 80B for realizing the process 80 of the present invention. The user interface 80B displays a scoreboard image 801 and simultaneously generates a request message 802 for requesting the users to indicate a location corresponding to one of the recognized scoreboard characteristics that has number data on the scoreboard image 801. In this case, a user response 805, which can be generated by a computer mouse, indicates a location corresponding to a scoring field of a team "BBB" on the scoreboard image 801 (by an arrow symbol as shown in FIG. 8B), and thus the embodiment can obtain a real location of the scoring field of a team "BBB" according to the user response 805, such that the embodiment can determine the recognized scoreboard characteristics according to the user response 805.

Therefore, by the embodiments mentioned above, the correctness of the recognized scoreboard characteristics can be determined according to the user response through the user interface, so that the highlight segments of the sport video can be determined more accurately. Please note that the embodiments of the user interface mentioned above are merely exemplary illustration of the present invention, and thus those skilled in the art can certainly make appropriate modifications according to practical demands, such as realized by combinations of the embodiments, which also belongs to the scope of the present invention.

Figure 9:
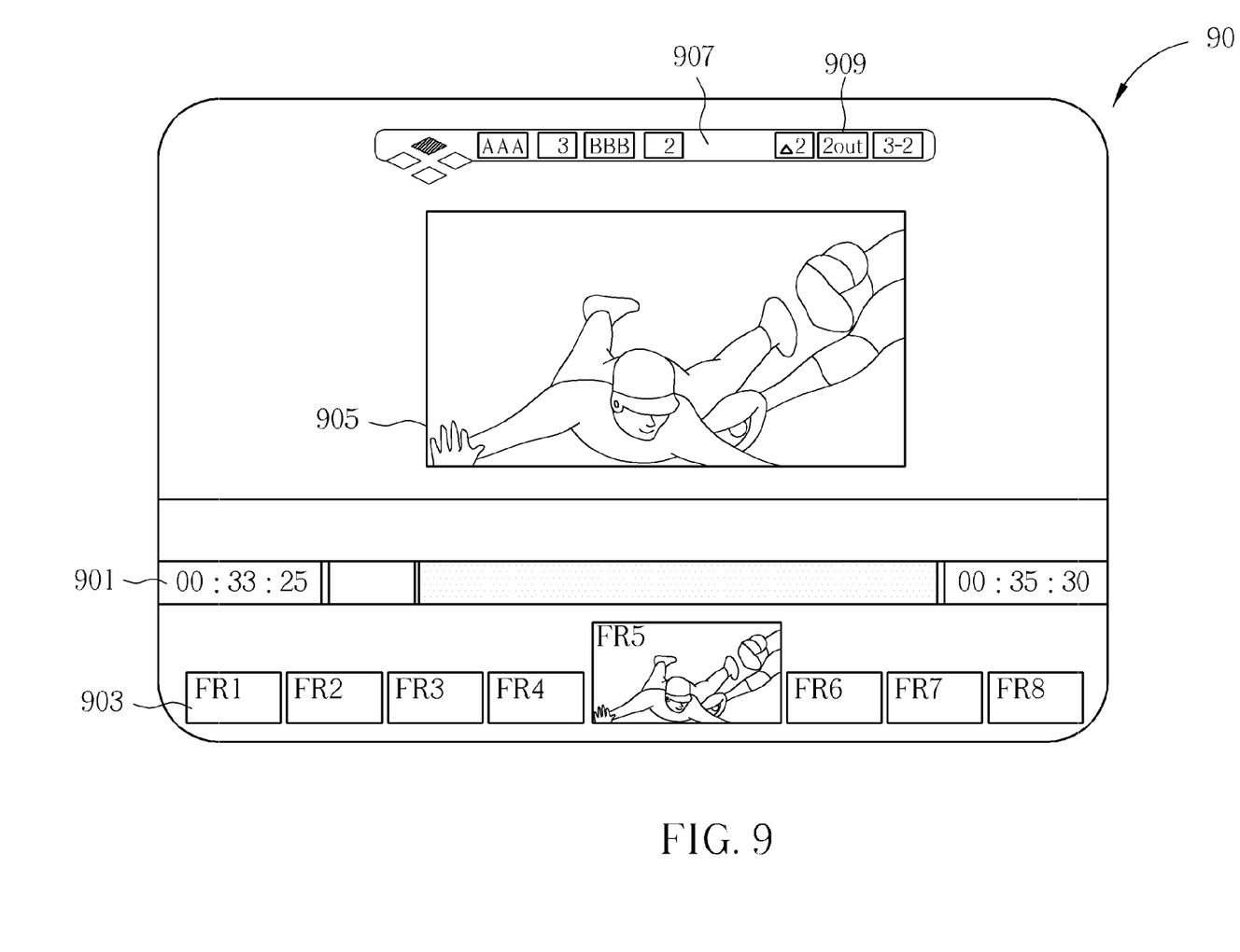
FIG. 9 is a schematic diagram of a highlight segment according to another embodiment of the present invention.

After the correctness of the recognized scoreboard characteristics are determined according to the user response, the highlight segments of the sport video can then be determined more accurately according to the variations of the plurality of scoreboard characteristics in the scoreboard image. For example, please refer to FIG. 9. FIG. 9 is a schematic diagram of a highlight segment 90 according to an embodiment of the present invention. In this case, a player out event is determined according to number data variation of a scoreboard characteristic (i.e. the number of player outs "2-out" 909) on the scoreboard image 907. Thus, by analyzing and recording occurrence time of the player out event according to related event information stored in the database, image frames FR1~FR8 can then be extracted to generate the highlight segment 90 from the baseball game video and displayed in an extraction area 903. In addition, the highlight segment 90 can be reviewed in an exhibition area 905, and the occurrence time of the player out event corresponding to image frames FR1~FR8 can further be displayed in a time area 901.

As combination of the mentioned above embodiments, by confirming the correctness of the recognized scoreboard characteristics corresponding to the scoreboard image through the user interface in advance, the present invention can determine the highlight segments of the sport video more accurately, so as to enhance convenience and watching delights for the users when searching and extracting highlight segments in the sport videos.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for determining highlight segments of a sport video, wherein the sport video comprises a plurality of image frames, the method comprising the steps of:
    receiving the sport video;
    analyzing the sport video to recognize a scoreboard image and a plurality of scoreboard characteristics, wherein the scoreboard image comprises at least one of the scoreboard characteristics;
    displaying a request message showing at least one recognized scoreboard characteristic on a user interface to receive a user response, wherein the user response includes a recognized result of one of the scoreboard characteristics;
    monitoring variations in the recognized scoreboard image among image frames according to the user response; and
    determining the highlight segments of the sport video according to the variations.

2. The method of claim 1, wherein at least one image frame comprises the scoreboard image.

3. The method of claim 1, the method further comprising:
providing a database, and
storing a metadata into the database.

4. The method of claim 3, wherein the metadata further comprises occurrence time, duration, and number of times according to the highlight segments in the sport video.

5. The method of claim 3, wherein the metadata is generated by the user response.

6. The method of claim 5, wherein the user response further comprises a location of one of the recognized scoreboard characteristics.

7. The method of claim 5, wherein the user response further comprises one of Yes, No, Correct, and Incorrect.

8. The method of claim 5, wherein the user response further comprises a number.

9. The method of claim 1, wherein analyzing step further comprises:
comparing the image frames of the sport video, wherein the image frames comprise the scoreboard image;
recognizing a region with small variation between the image frames, wherein the recognized region is determined to be the scoreboard image.

10. The method of claim 1, the method further comprising:
providing a database; and
storing the recognized result into the database to be reference patterns when processing subsequent sport video analysis for the same sport game.

11. The method of claim 10, wherein analyzing step further comprises:
comparing the image frames with the reference patterns of each of sport games stored in the database; and
determining the matched patterns in the image frames as the scoreboard image and the scoreboard characteristics thereof.

12. The method of claim 1, wherein the scoreboard characteristics comprise content data, wherein the content data comprises number data, text data, brightness and status of the scoreboard characteristics in the image frames.

13. The method of claim 12, wherein displaying step further comprising:
analyzing at least one content data of the recognized scoreboard characteristics;
displaying at least one analyzed content data;
generating the request message on the user interface simultaneously to receive the user response; and
determining whether the analyzed content data is correct according to the user response.

14. The method of claim 1, wherein the scoreboard characteristics further comprise locations, size, and shape thereof.

15. The method of claim 14, wherein displaying step further comprising:
displaying at least one indicated location of the recognized scoreboard characteristics;
generating the request message on the user interface simultaneously to receive the user response; and
determining whether the indicated location is correct according to the user response.

16. The method of claim 14, wherein displaying step further comprising:
displaying a plurality sets of possible locations of the recognized scoreboard characteristics;
generating the request message simultaneously to receive the user response directly selecting a correct set of locations of the recognized scoreboard characteristics, wherein another request message is displayed simultaneously to receive the user response directly indicating a correct location of the recognized scoreboard characteristics if the possible locations are all incorrect; and
determining the indicated location of the recognized scoreboard characteristics according to the user response.

17. The method of claim 14, wherein displaying step further comprising:
displaying the recognized scoreboard image;
generating the request message on the user interface simultaneously to receive the user response directly indicating a location of one of the scoreboard characteristics; and
determining the indicated location according to the user response.

18. An apparatus for determining highlight segments of a sport video, wherein the sport video comprises a plurality of image frames, the apparatus comprising:
a receiver for receiving the sport video;
an analyzer connected to the receiver for analyzing the sport video to recognize a scoreboard image and a plurality of scoreboard characteristics, wherein the scoreboard image comprises at least one of the scoreboard characteristics;
a user interface connected to the analyzer for displaying a request message showing at least one recognized scoreboard characteristic to receive a user response, wherein the user response includes a recognized result of one of the scoreboard characteristics;
a detector coupled to the user interface for monitoring variations in the recognized scoreboard image among image frames according to the user response; and
a determination module for determining the highlight segments of the sport video according to the variations.

19. The apparatus of claim 18, wherein at least one image frame comprises the scoreboard image.

20. The apparatus of claim 18, wherein the apparatus further comprises a database and the database stores a metadata.

21. The apparatus of claim 20, wherein the metadata further comprises occurrence time, duration, and number of times according to the highlight segments in the sport video.

22. The apparatus of claim 20, wherein the metadata is generated by the user response.

23. The apparatus of claim 22, wherein the user response further comprises a location of one of the recognized scoreboard characteristics.

24. The apparatus of claim 22, wherein the user response further comprises one of Yes, No, Correct, and Incorrect.

25. The apparatus of claim 22, wherein the user response further comprises a number.

26. The apparatus of claim 18, wherein the analyzer further comprises:
a first comparator for comparing the image frames of the sport video for recognizing a region with small variation between the image frames, wherein the image frames comprise the scoreboard image; and
a first recognizer for determining the recognized region to be the scoreboard image.

27. The apparatus of claim 18, wherein the apparatus further comprises a database and the database stores the recognized result to be reference patterns when processing subsequent sport video analysis for the same sport game.

28. The apparatus of claim 27, wherein the analyzer further comprises:
a second comparator for comparing the image frames with the reference patterns of each of sport games stored in the database; and a second recognizer for determining the matched patterns in the image frames as the scoreboard image and the scoreboard characteristics thereof.

29. The apparatus of claim 18, wherein the scoreboard characteristics comprise content data, wherein the content data comprises number data, text data, brightness and status of the scoreboard characteristics in the image frames.

30. The apparatus of claim 18, wherein the scoreboard characteristics further comprise locations, size, and shape thereof.

31. The apparatus of claim 18, wherein the user interface further comprises:

a request generator for displaying the request message showing at least one recognized scoreboard characteristic.

32. The apparatus of claim 18, wherein the user interface further comprises:

a request receiver for receiving the user response for determining the recognized scoreboard characteristics, wherein the user response includes a recognized result of one of the scoreboard characteristics.

* * * * *